Sept. 11, 1951   C. D. BOCK ET AL   2,567,691
NONLINEAR ELECTRICAL RECTIFIER
Filed Nov. 14, 1949
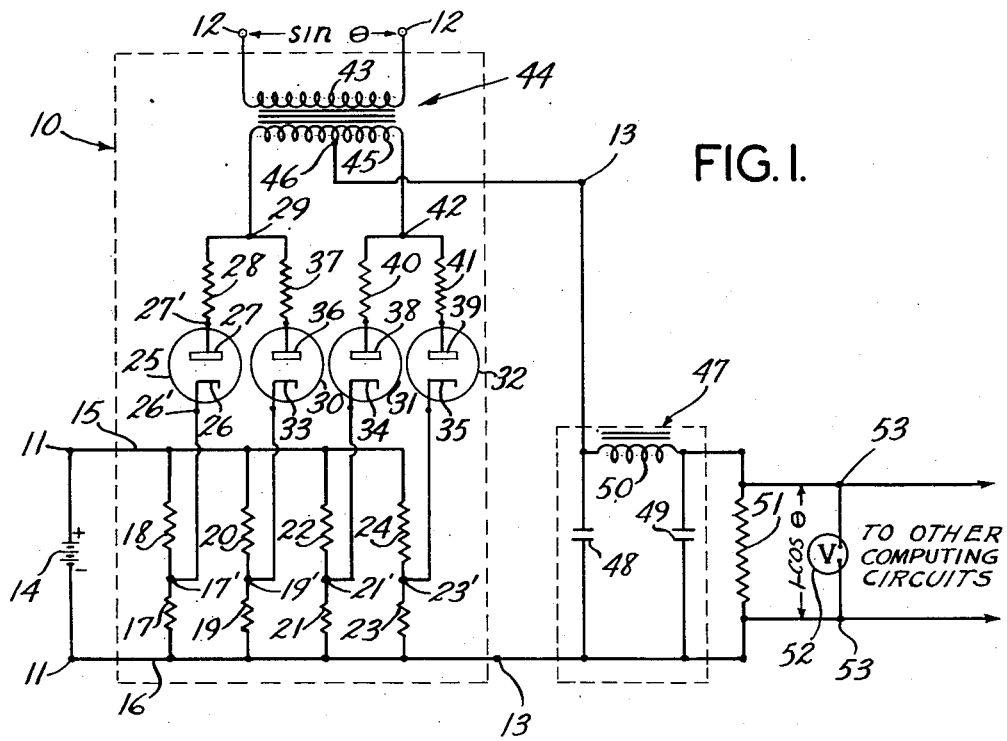
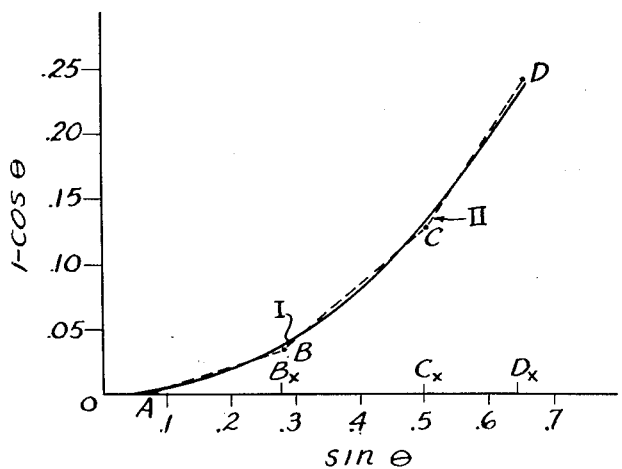
INVENTORS
CHARLES D. BOCK &
RALPH K. BONELL
BY
Their ATTORNEYS.

Patented Sept. 11, 1951

2,567,691

UNITED STATES PATENT OFFICE 2,567,691

NONLINEAR ELECTRICAL RECTIFIER

Charles D. Bock and Ralph K. Bonell, New York, N. Y., assignors to Arma Corporation, Brooklyn, N. Y., a corporation of New York Application November 14, 1949, Serial No. 127,142

12 Claims. (Cl. 321—32)

This invention relates to electrical apparatus for converting from a given to a desired function of a variable quantity, and has particular reference to apparatus for developing a rectified signal proportional to the desired function when the given function is represented by an alternating current signal.

For example, in electrical computing apparatus it is frequently desirable to convert an alternating current input signal whose amplitude is proportional to one trigonometric function of a variable angle, to a rectified signal proportional to another trigonometric function of that angle. The accuracy of the conversion may be judged by comparing the curve of the rectified signal, plotted as a function of the input signal, with the similarly plotted curve of the desired function.

In accordance with the present invention, an electrical function conversion apparatus is provided, in which a non-linear rectifier is employed which is so constructed and arranged as to have an output characteristic in the form of a sequence of straight line segments, with each segment adjustable individually as to origin and slope so that the series of segments intersect at spaced points, jointly to approximate the curve of the desired output function.

In a preferred embodiment of the invention, a plurality of parallel half-wave rectifying devices is utilized to provide the aforementioned output function curve segments, and to that end these devices are individually biased to initiate conduction at increasingly large input signals, each starting point corresponding to a point of intersection of successive straight line segments of the desired rectified output signal. The lower resistance of the non-linear rectifier that is provided by the added parallel circuit as each successive rectifying device conducts in turn, increases the rectifier output proportionally. The added effect of each rectifying device is controlled by regulating the series resistance in its circuit, thereby adjusting the relation between the output and the input of the rectifier to correspond to the slope of the particular segment of the desired output function involved.

It will be seen that the output signal of the function conversion unit of this invention can be made proportional to any function of the input signal which can be approximately represented by a series of straight lines of increasing slopes, these slopes being predetermined in the new apparatus by proper choice of the resistance in series with the corresponding rectifying device, and the successive straight lines being made to intersect at selected points by application of the proper bias to each rectifying device, these biases determining the points at which conduction starts in the several sections of the rectifier. The sequence of straight line segments representing the rectifier output may thereby be caused to describe a curve which closely approximates that of the desired output function, the approximation being made as close to the exact function as may be desired simply by using as many additional properly biased and loaded rectifying devises as required to provide a correspondingly greater number of more closely spaced intersection points for the segments delineating the function curve.

For a more complete understanding of the invention, reference may be had to the following drawings, in which:

Figure 1 is a diagram of a circuit of the conversion apparatus of this invention for producing a non-linear rectified signal; and Fig. 2 illustrates two curves, one being the exact smooth curve, and the other being an approximate broken-line curve representing the value of $1 - \cos \theta$ plotted against $\sin \theta$ for values of an angle, designated $\theta$, between 0 and 40 degrees.

Referring to Fig. 1, numeral 10 generally designates the non-linear rectifier unit of this invention having input terminals 12 and output terminals 13. A source of constant unidirectional voltage 14 is connected across terminals 11, to which conductors 15 and 16 are connected. Hence, the potential of conductor 15 is positive with respect to conductor 16. Although this unidirectional voltage source 14 is indicated on the drawings as a battery, it is understood that any other suitable source may be used, such as a rectified alternating voltage supply, for example.

Resistors 17 and 18 are connected in series across conductors 15, 16 and constitute a voltage divider wherein the voltage between conductor 16 and the junction 17' of resistors 17 and 18 is governed by the values of resistors 17 and 18. Additional voltage dividers composed of resistor pairs 19—20, 21—22 and 23—24 of varying values to be described and having corresponding junctions 19', 21', 23', respectively, are connected in parallel across conductors 15, 16, as shown in Fig. 1. It may be desirable in some instances to have variable voltage dividers. In this case each set of two series connected resistors connected across conductors 15 and 16 would be replaced by a single slide wire type resistance, and the junctions 17', 19', 21', and 23' would be replaced by the brushes or sliders on the respective resistances. Junction 17' of resistor pair 17—18 is connected to one terminal 26' of a suitable rectifying device 25, whose other terminal 27' is connected to one end of a resistor 28.

Rectifying device 25 preferably is of the heated-cathode, two element vacuum tube type and its cathode 26 and anode 27 are connected respectively to terminals 26' and 27', so that tube 25 provides a small constant resistance across terminals 26'—27' when cathode 26 is of negative polarity with respect to anode 27, and a virtually infinite resistance when the cathode 26 is of positive polarity.

Rectifying devices 30, 31, 32 are similar to rectifying device 25, and have their respective cathodes 33, 34, 35 connected to junctions 19', 21', 23', respectively, between corresponding resistor pairs 19—20, 21—22 and 23—24. The anode 36 of rectifying device 30 is connected to terminal 29 through resistor 37, whereby terminal 29 is common to resistors 28 and 37. Similarly, the respective anodes 38, 39 of rectifying devices 31, 32 are connected through resistors 40, 41, respectively, to their common terminal 42.

With this arrangement, rectifying devices 25 and 30 operate on one half-cycle of the input signal and rectifying devices 31 and 32 operate on the opposite half-cycle of the signal.

The variable alternating current input signal source is connected to input terminals 12 of rectifier unit 10, and is applied to the primary winding 43 of input transformer 44 connected to input terminals 12. The secondary winding 45 of input transformer 44 is connected across terminals 29 and 42 of resistor pairs 28—37 and 40—41, and the secondary winding center tap 46 is connected to one of the output terminals 13, the other of which is the terminal of conductor 16.

To the output terminals 13 of the non-linear rectifier 10 just described is connected a low pass filter 47 of the pi type, containing condensers 48, 49 and which are separated by inductance 50. The output of unit 10, smoothed by filter 47, is applied to load resistor 51, across the output terminals 53 of which a suitable indicator 52, such as a direct-current voltmeter, is connected.

Referring to Fig. 2, two curves I and II of $1-\cos\theta$ are shown plotted against $\sin\theta$ of any angle, $\theta$. Curve I is a smooth curve representing the exact function $(1-\cos\theta)$, while curve II is an approximation composed of a series of straight lines OA, AB, BC, CD. In considering the operation of the conversion unit of this invention, it will be assumed that a signal proportional to $1-\cos\theta$ for values of $\theta$ between 0 and 40° is desired when a signal proportional to $\sin\theta$ is available across input terminals 12. The output voltage accordingly developed across output terminals 53 of the apparatus of the present invention is proportional to the approximate function, and is represented by curve II of Fig. 2.

In operation of the apparatus shown in Fig. 1, the biases applied to rectifying devices 25, 30, 31 and 32 by the voltages between conductor 16 and junctions 17', 19', 21', 23', respectively, are such that when the alternating current signals applied to primary winding 43 of input transformer 44, have amplitudes proportional to values of $\sin\theta$ between O and A, as shown in Fig. 2, rectifying devices 25, 30, 31 and 32 remain biased beyond cutoff so that no current flows through secondary winding 45 of input transformer 44, and hence no current flows in resistor 51. The voltage across output terminals 53 therefore is zero for signal voltages of $\sin\theta$ between O and A so that it may be represented by the line OA of Fig. 2.

Resistors 17 and 18 are chosen so that input signal voltages greater in amplitude than those corresponding to A of Fig. 2 allow anode 27 of rectifier tube 25 to become positive with respect to cathode 26 during a portion of those half-cycles which make terminal 29 positive with respect to center tap 46, while rectifiers 30, 31, 32 remain biased beyond cutoff, as previously described. Consequently, a circuit is completed in which current flows from center tap 46 to terminal 29, through resistor 28, rectifying device 25, resistor 17, filter 47 and load 51, back to center tap 46. The current through resistor 51 is proportional to the excess of signal voltage over that corresponding to A, while the value of limiting resistor 28 regulates the proportionality factor.

The ratio of output signal across terminals 53 to input signal at terminals 12 is dependent on the total series resistance in the output circuit and is controlled principally by resistor 28. The value of resistor 17 is chosen initially to produce the correct rectifier bias. By suitable choice of resistor 28, the voltage drop across load resistor 51, indicated by direct current voltmeter 52 and which may be used as an input signal to other computing instruments, is made proportional to that portion of the approximate $1-\cos\theta$ characteristic represented by the straight line AB for values of $\sin\theta$ between A and the abscissa of B, shown in Fig. 2 as $Bx$. It is important that the value of resistor 17 be kept small in comparison to the value of resistor 28, in order that the adjustments of the proportionality factor and tube bias will be practically independent of each other.

Resistors 21 and 22 are chosen so that, for a signal voltage corresponding to a value of $\sin\theta$ greater than that indicated by abscissa $Bx$ in Fig. 2, the negative bias applied to anode 38 of rectifying device 31 by resistor 21 is overcome during a portion of the half-cycle which makes terminal 42 positive with respect to center tap 46 of input transformer secondary winding 45. Under these circumstances, anode 38 is made positive with respect to cathode 34 and a circuit is completed in which current flows from center tap 46 to terminal 42, through resistor 40, rectifying device 31, resistor 21, filter 47 and load resistor 51, back to center tap 46.

As the signal increases above that corresponding to abscissa $Bx$, the current in resistor 51 increases proportionally, beyond the current present when the signal corresponds to $Bx$, and the proportionality factor depends mainly on the values of resistors 28 and 40. The value of resistor 28 is determined as previously described, while the value of resistor 40 is chosen so as to make the voltage drop across resistor 51 proportional to that portion of the approximate $1-\cos\theta$ characteristic represented by line BC of curve II for signal voltages corresponding to values of $\sin\theta$ between $Bx$ and $Cx$, the abscissa of point C on curve II. In other words, the increment in the slope of the output characteristic corresponding to the portion BC of curve II, beyond the slope of the output characteristic corresponding to the portion AB of curve II, is determined mainly by resistor 40. Like the aforementioned relation between the values of resistors 17 and 28, the value of resistor 21 should be small compared to the value of resistor 40 in order that the adjustment of the proportionality factor and tube bias will be virtually independent. Rectifying devices 25 and 31 are preferably arranged as shown in Fig. 1 where conduction occurs during opposite half cycles of signal in order to distribute the load on filter 47 more evenly over the complete cycle.

When signal voltages corresponding to values of sin $\theta$ between $Cx$ and $Dx$, i. e., the abscissa of D, are applied to transformer 44, the voltage drop across resistor 51 must be proportional to the portion of the approximate $1-\cos \theta$ characteristic represented by line CD, which has a steep slope as shown in Fig. 2. It is accordingly desirable to utilize a full wave rectifier in preference to a half-wave rectifier in order to preclude excessive peak loading of the rectifying device and filter. Hence, the resistors 19, 20 and 37 in the circuit of rectifying device 30 are made similar to the corresponding resistors 23, 24 and 41, respectively, in the circuit of rectifying device 32. To this end, the values of resistors 19, 20, 23 and 24 are chosen so that the negative bias voltages applied to anodes 36 and 39 are overcome during signals corresponding to values greater than $Cx$, so that rectifying device 30 conducts during a portion of the positive half-cycle of a favorable input signal, thereby completing an alternate circuit from center tap 46, terminal 29, resistors 37 and 19, load resistor 51, back to center tap 46. On the other hand, rectifying device 32 conducts during a corresponding portion of the negative half-cycle, thereby completing an alternate circuit from center tap 46, terminal 42, resistors 41 and 23, load resistor 51, back to center tap 46.

The rectified output currents for the two half-waves add in the output resistor 51, and the current through resistor 51 increases proportionally with the input signal of sin $\theta$ in excess of that corresponding to $Cx$, beyond the current present when the signal input corresponds to $Cx$, the proportionality factor depending mainly on values of parallel resistors 28, 37 and 40, 41.

Resistors 28, 40 are chosen as previously described, so that the proportionality factor for the line CD of curve II is determined mainly by the selection of resistors 37, 41, which are chosen so that the voltage drop across resistor 51 is proportional to $1-\cos \theta$ as determined by line CD for signal voltages corresponding to values of sin $\theta$ between $Cx$ and $Dx$ in Fig. 2. Resistors 37, 41 determine the increment in slope of the output characteristic corresponding to the portion CD of curve II from the slope of the output characteristic corresponding to the portion BC of curve II. Full wave rectification is provided for the steep slope of the straight line segment CD in order to be able to attain the desired output, while at the same time the load on the rectifying device and the filter is distributed over the complete cycle. As previously stated, it is important that the value of resistors 19, 23 be made small compared to the value of resistors 37, 41, respectively, for ease of adjustment of the output characteristic of the function conversion apparatus of this invention.

As is exemplified by curve II, the output signal of the apparatus may be made proportional to any function of the input signal which can be represented by a series of straight lines of increasing slope, i. e., lines OA, AB, BC and CD. The points A, B and C at which these successive straight lines intersect are selected by suitably choosing the bias applied to each rectifier, while the slopes of the lines are adjusted by proper choice of the resistance in series with the rectifying device. The proximity of curve II to exact function curve I shows that the approximation provided by the apparatus of this invention may be very close to being accurate and it has been found to be sufficiently accurate for practical purposes.

Although a preferred embodiment of the invention has been illustrated and described herein, it is to be understood that the invention is not limited thereby, but is susceptible of changes in form and detail within the scope of the appended claims.

We claim:

1. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal of said source and a conductor connected to the other terminal thereof and each having an intermediate tap, rectifying devices corresponding to said dividers and interposed between the taps of the same and one of the terminals of said secondary winding, a second set of voltage dividers connected in parallel between said one terminal and said conductor and each having an intermediate tap, and a second set of rectifying devices corresponding to said second set of voltage dividers interposed between the taps of the same and the other terminal of said secondary winding, said dividers being adjusted to impress a different biasing voltage on the corresponding successive rectifying devices to provide a rectified output voltage between the transformer secondary winding tap and said conductor which is proportional to said desired function.

2. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal of said source and a conductor connected to the other terminal thereof and each having a tap, and rectifying devices corresponding to said dividers and interposed between the taps of same and the terminals of said secondary winding, said dividers being adjusted to impress a different biasing voltage on the corresponding successive rectifying devices to provide a rectified output voltage between the transformer secondary winding tap and said conductor which is proportional to said desired function.

3. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal of said source and a conductor connected to the other terminal thereof, each said voltage divider comprising a pair of resistors having a common junction point, and rectifying devices corresponding to said dividers and interposed between the junction points of the same and the terminals of said secondary winding, said dividers being adjusted to impress a different biasing voltage on the corresponding successive rectifying devices to provide a rectified output voltage between the transformer secondary winding tap and said conductor which is proportional to said desired function.

4. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal of said source and a conductor connected to the other terminal thereof and each having an intermediate tap, rectifying devices corresponding to said dividers and connected between the taps of the same and one of the terminals of said secondary winding, a second set of voltage dividers connected in parallel between said one terminal and said conductor and each having an intermediate tap, a second set of rectifying devices corresponding to said second set of voltage dividers interposed between the taps of the same and the other terminal of said secondary winding, and a resistance interposed between each rectifying device and the secondary winding, said dividers and resistances being adapted to control the corresponding successive rectifying devices to provide a rectified output voltage between the transformer secondary winding tap and said conductor which is proportional to said desired function.

5. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal of said source and a conductor connected to the other terminal thereof and each having a tap, rectifying devices corresponding to said dividers and connected between the taps of same and the terminals of said secondary winding, and a resistance interposed between each rectifying device and the secondary winding, said dividers and resistances being adapted to control the corresponding successive rectifying devices to provide a rectified output voltage between the transformer secondary winding tap and said conductor which is proportional to said desired function.

6. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal of said source and a conductor connected to the other terminal thereof, each said voltage divider comprising a pair of resistors having a common junction point, rectifying devices corresponding to said dividers and connected between the junction points of the same and the terminals of said secondary winding, and a resistance interposed between each rectifying device and the secondary winding, said dividers and resistances being adapted to control the corresponding successive rectifying devices to provide a rectified output voltage between the transformer secondary winding tap and said conductor which is proportional to said desired function.

7. In electrical apparatus for converting an alternating current input signal of a given function to a rectified output signal proportional to a desired function, the combination of an input signal transformer having a center-tapped secondary winding, a source of constant unidirectional voltage, two pairs of voltage dividers connected in parallel between one terminal of said source and a conductor connected to the other terminal thereof, two pairs of parallel two-terminal rectifying devices corresponding to said divider pairs, connections between first terminals of one of said pairs of rectifying devices and one of the terminals of said secondary winding, and connections between first terminals of the other of said pairs of rectifying devices and the other terminal of said secondary winding, the second terminals of said rectifying devices being connected to intermediate points on said dividers to impress a different biasing voltage on the corresponding rectifying devices to provide a rectified output voltage between the transformer secondary winding center tap and said conductor which is proportional to said desired function.

8. In electrical apparatus for converting an alternating current input signal of a given function to a rectified output signal proportional to a desired function, the combination of an input signal transformer having a center-tapped secondary winding, a source of constant unidirectional voltage, two pairs of voltage dividers connected in parallel between one terminal of said source and a conductor connected to the other terminal thereof, two pairs of parallel two-terminal rectifying devices corresponding to said divider pairs, connections between first terminals of one of said pairs of rectifying devices and one of the terminals of said secondary winding, connections between first terminals of the other of said pairs of rectifying devices and the other terminal of said secondary winding, connections between the second terminal of each rectifying device and an intermediate point on the corresponding voltage divider, and a resistance interposed between each rectifying device and the corresponding terminal of said secondary winding, the intermediate points on said dividers and corresponding resistances being selected to impress a different biasing voltage on the corresponding successive rectifying devices to provide a rectified output voltage between the transformer secondary winding center tap and said conductor which is proportional to said desired function.

9. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal of said source and a conductor connected to the other terminal thereof and each having an intermediate tap, and thermionic rectifying devices corresponding to said dividers and each having a heated cathode connected to the tap of the corresponding voltage divider and an anode connected to one of the terminals of said secondary winding, the taps of said dividers being selected to impress a different biasing voltage on the corresponding successive rectifying devices to provide a rectified output voltage between the transformer secondary winding tap and said conductor which is proportional to said desired function.

10. In electrical apparatus for converting an alternating current input signal of a given function to a rectified output signal proportional to a desired function, the combination of an input signal transformer having a tapped secondary winding, a source of constant unidirectional voltage, a plurality of voltage dividers connected in parallel between one terminal thereof and each having an intermediate tap, thermionic rectifying devices corresponding to said dividers and each having a heated cathode connected to the tap of the corresponding voltage divider and an anode connected to one of the terminals of said secondary winding, and a resistance interposed between each rectifying device and the secondary winding, said dividers and resistances being adapted to control the corresponding successive rectifying devices to provide a rectified output voltage between the transformer secondary winding tap and said conductor which is proportional to said desired function.

11. In electrical apparatus for converting an alternating current input signal of a given function to a rectified output signal proportional to a desired function, the combination of an input signal transformer having a center-tapped secondary winding, a source of constant unidirectional voltage, two pairs of voltage dividers connected in parallel between one terminal of said source and a conductor connected to the other terminal thereof and each having an intermediate tap, two pairs of parallel thermionic rectifying devices corresponding to said divider pairs and each having a heated cathode connected to the tap of the corresponding voltage divider and an anode, connections between the anodes of one of said pairs of rectifying devices and one of the terminals of said secondary winding, and connections between the other of said pairs of rectifying devices and the other secondary winding terminal, the taps of said dividers being selected to impress a different biasing voltage on the corresponding successive rectifying devices to provide a rectified output voltage between the transformer secondary winding tap and said conductor which is proportional to said desired function.

12. In electrical apparatus for converting an alternating current input signal of a given function to a rectified output signal proportional to a desired function, the combination of an input signal transformer having a center-tapped secondary winding, a source of constant unidirectional voltage, two pairs of voltage dividers connected in parallel between one terminal of said source and a conductor connected to the other terminal thereof and each having an intermediate tap, two pairs of parallel thermionic rectifying devices corresponding to said divider pairs and each having a heated cathode connected to the tap of the corresponding voltage divider and an anode, connections between the anodes of one of said pairs of rectifying devices and one of the terminals of said secondary winding, connections between the other of said pairs of rectifying devices and the other secondary winding terminal, and a resistance interposed between each said anode and the corresponding terminal of said secondary winding, the taps of said dividers and corresponding resistances being selected to impress a different biasing voltage on the corresponding successive rectifying devices to provide a rectified output voltage between the transformer secondary winding tap and said conductor which is proportional to said desired function.

CHARLES D. BOCK.
RALPH K. BONELL.

No references cited.